US009282448B2

(12) United States Patent
Liu

(10) Patent No.: US 9,282,448 B2
(45) Date of Patent: Mar. 8, 2016

(54) METHOD, SYSTEM AND APPARATUS FOR PROVIDING STREAMING MEDIA SERVICE

(75) Inventor: Jianmin Liu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 357 days.

(21) Appl. No.: 13/992,454

(22) PCT Filed: Apr. 12, 2011

(86) PCT No.: PCT/CN2011/072640
§ 371 (c)(1),
(2), (4) Date: Jun. 7, 2013

(87) PCT Pub. No.: WO2012/079321
PCT Pub. Date: Jun. 21, 2012

(65) Prior Publication Data
US 2013/0254353 A1 Sep. 26, 2013

(30) Foreign Application Priority Data
Dec. 14, 2010 (CN) .......................... 2010 1 0588355

(51) Int. Cl.
*H04W 8/00* (2009.01)
*H04W 76/02* (2009.01)
*H04L 29/06* (2006.01)

(52) U.S. Cl.
CPC ............ *H04W 8/00* (2013.01); *H04L 65/1069* (2013.01); *H04L 65/403* (2013.01); *H04L 65/4069* (2013.01); *H04L 65/4076* (2013.01); *H04W 76/02* (2013.01)

(58) Field of Classification Search
USPC ....................................................... 709/219
See application file for complete search history.

(56) References Cited

U.S. PATENT DOCUMENTS

| 7,330,453 B1* | 2/2008 | Borella et al. ................. 370/338 |
| 2008/0010653 A1* | 1/2008 | Ollikainen et al. ............. 725/25 |
| 2008/0106600 A1* | 5/2008 | Benco et al. ................... 348/157 |
| 2009/0234735 A1 | 9/2009 | Maurer |

FOREIGN PATENT DOCUMENTS

| CN | 101360114 A | 2/2009 |
| CN | 101562790 A | 10/2009 |
| CN | 101771953 A | 7/2010 |

OTHER PUBLICATIONS

International Search Report in international application No. PCT/CN2011/072640, mailed on Sep. 22, 2011
English Translation of the Written Opinion of the International Search Authority in international application No. PCT/CN2011/072640, mailed on Sep. 22, 2011.

* cited by examiner

*Primary Examiner* — Tu Nguyen
(74) *Attorney, Agent, or Firm* — Oppedahl Patent Law Firm LLC

(57) ABSTRACT

A method, a system and an apparatus for providing streaming media service are disclosed. The system includes: a master mobile terminal configured to establish a connection with a streaming media server, and perform acquisition, encoding and transmission of local audio and video data; a slave mobile terminal configured to establish a connection with the streaming media server, receive the audio and video data transmitted from the master mobile terminal, decode the audio and video data received, and play the audio and video data decoded with a local streaming media player; and the streaming media server configured to manage a connection between the master mobile terminal and the slave mobile terminal, establish a temporary user packet, and forward a streaming media data flow transmitted by the master mobile terminal.

10 Claims, 5 Drawing Sheets

METHOD, SYSTEM AND APPARATUS FOR PROVIDING STREAMING MEDIA SERVICE

TECHNICAL FIELD

The disclosure relates to a wireless communication technology, and in particular to a method, a system and an apparatus for providing streaming media service.

BACKGROUND

Streaming media belongs to one of 3-Generation (3G) value-added services of mobile operators and its technology is widely applied in services including mobile phone videos, online Video On Demand (VOD)/live broadcast and the like. After being requested on demand by utilizing a pre-installed client login server or by directly accessing a streaming media server, these services are played by a preset streaming media player.

In an original service design and subsequent usage scenarios, a mobile phone terminal interacts more with a server, the terminal initiates a VOD request and the server responds to the request, and so on. During this process, a streaming media content provider provides required resources, and a user obtains such interested content and information as news, entertainment, tutorial sources and the like by requesting streaming media sources on demand. However, this process has the following disadvantage: this process relies heavily on the content provider, and the user has to choose what the content provider provides; such a Client and Server (CS) mode limits the flexibility of streaming media service, and limits the serviceable range and development of the streaming media service to a certain extent. However, along with the development of the present 3G or next-generation network and the upgrading of mobile phone hardware, higher requirement is provided for the applied range of streaming media correspondingly.

SUMMARY

The technical problem to be solved by the disclosure is to provide a method, a system and an apparatus for providing streaming media service.

A method for providing streaming media service is provided in an embodiment of the disclosure, which includes the following steps:

after receiving a connection request providing streaming media initiated by a master mobile terminal, a wireless communication network establishes a connection for the master mobile terminal, and the wireless communication network establishes a temporary user packet for the master mobile terminal; and after the connection is established, the master mobile terminal provides a streaming media data flow to the wireless communication network.

Preferably, the master mobile terminal initiates the connection request providing the streaming media to a wireless communication network side device;

after receiving the connection request providing the streaming media initiated by the master mobile terminal, the network side device notifies a streaming media server receiving the streaming media data provided by the master mobile terminal;

after receiving, from the network side device, a notification of receiving the streaming media data provided by the master mobile terminal, the streaming media server establishes the temporary user packet for the master mobile terminal providing the streaming media data, and the streaming media server feeds a response carrying information of the temporary user packet back to the network side device;

after the streaming media server feeds back the response carrying the information of the temporary user packet, the network side device feeds a response of the connection request providing the streaming media back to the master mobile terminal, wherein the response of the connection request providing the streaming media carries the information of the temporary user packet;

after receiving the response of the connection request providing the streaming media fed back by the network side device, the master mobile terminal sends a connection request of requesting for joining the temporary user packet to the streaming media server;

after receiving the connection request of requesting for joining the temporary user packet from the master mobile terminal, the streaming media server establishes a connection between the master mobile terminal and the temporary user packet, and the streaming media server returns a connection success response to the network side device;

the network side device returns the connection success response to the master mobile terminal;

after receiving the connection success response, the master mobile terminal converts acquired data for making the streaming media into the streaming media data, and the master mobile terminal provides the converted streaming media data to the streaming media server; and the streaming media server receives the streaming media data provided by the master mobile terminal.

Preferably, the method may further include:

after receiving a call request of a slave mobile terminal to the master mobile terminal, the wireless communication network adds the slave mobile terminal to the temporary user packet and transmits the streaming media data flow provided by the master mobile terminal to the slave mobile terminal.

Preferably, the slave mobile terminal initiates the call request of requesting for providing the streaming media data to the master mobile terminal providing the streaming media data;

when receiving the call request of requesting for providing streaming media data of the slave mobile terminal to the master mobile terminal providing the streaming media data, the network side device notifies an identifier of the master mobile terminal providing the streaming media data and an identifier of the slave mobile terminal to the streaming media server;

after receiving a notification including the identifier of the master mobile terminal providing the streaming media data and the identifier of the slave mobile terminal from the network side device, the streaming media server establishes a connection with the slave mobile terminal according to the identifier of the slave mobile terminal, and after adding the slave mobile terminal to the temporary user packet according to the identifier of the master mobile terminal providing the streaming media data, the streaming media server provides streaming media data of the temporary user packet to the slave mobile terminal; and after receiving a call success message, the slave mobile terminal receives the streaming media data sent by the streaming media server.

A system for providing streaming media service is provided in an embodiment of the disclosure, which includes: a master mobile terminal, a network side device and a streaming media server, wherein the master mobile terminal is configured to initiate a connection request providing streaming media to the wireless communication network side device, after receiving a response of the connection request providing the streaming media fed back by the network side device, send a connection request of requesting for joining the temporary user packet to the streaming media server; and after receiving a connection success response, convert acquired data for making streaming media into streaming media data and provide the converted streaming media data to the streaming media server;

the network side device is configured to, after receiving the connection request providing the streaming media initiated by the master mobile terminal, notify the streaming media server receiving the streaming media data provided by the master mobile terminal; after the streaming media server feeds back a response carrying information of the temporary user packet, feed a response of the connection request providing the streaming media back to the master mobile terminal, wherein the response of the connection request providing the streaming media carries the information of the temporary user packet; and after receiving the connection success response sent by the streaming media server, return the connection success response to the master mobile terminal; and the streaming media server is configured to, after receiving, from the network side device, a notification of receiving the streaming media data provided by the master mobile terminal, establish the temporary user packet for the master mobile terminal providing the streaming media data, and feed a response carrying information of the temporary user packet back to the network side device; after receiving the connection request of requesting for joining the temporary user packet from the master mobile terminal, establish a connection between the master mobile terminal and the temporary user packet, and return a connection success response to the network side device; and receive the streaming media data provided by the master mobile terminal.

Preferably, the system for providing streaming media service may further include:

a slave mobile terminal configured to initiate a call request of requesting for providing streaming media data to the master mobile terminal providing the streaming media data; and after receiving a call success message, receive the streaming media data sent by the streaming media server;

the network side device may be further configured to, when receiving the call request requesting for providing streaming media data of the slave mobile terminal to the master mobile terminal providing the streaming media data, notify an identifier of the master mobile terminal providing the streaming media data and an identifier of the slave mobile terminal to the streaming media server; and the streaming media server may be further configured to, after receiving a notification including the identifier of the master mobile terminal providing the streaming media data and the identifier of the slave mobile terminal from the network side device, establish a connection with the slave mobile terminal according to the identifier of the slave mobile terminal, and after adding the slave mobile terminal to the temporary user packet according to the identifier of the master mobile terminal providing the streaming media data, provide streaming media data of the temporary user packet to the slave mobile terminal.

A mobile terminal is provided in an embodiment of the disclosure, which includes:

a first requesting module configured to initiate a connection request providing streaming media to a wireless communication network side device;

a first receiving module configured to receive a response of the connection request providing the streaming media fed back by the network side device;

a second requesting module configured to send a connection request of requesting for joining a temporary user packet to the streaming media server;

a second receiving module configured to receive a connection success response fed back by the network side device;

a data acquisition module configured to acquire data for making the streaming media;

a data conversion module configured to convert the acquired data for making the streaming media into streaming media data; and a streaming media providing module configured to, after receiving the connection success response fed back by the network side device, provide the converted streaming media data to a network side.

A mobile terminal is provided in an embodiment of the disclosure, which includes:

a calling module configured to initiate a call request of requesting for providing streaming media data to a mobile terminal providing the streaming media data; and a receiving module configured to, after receiving a call success message, receive the streaming media data sent by a streaming media server.

A network side device is provided in an embodiment of the disclosure, which includes:

a terminal message receiving module configured to receive a connection request providing streaming media initiated by a mobile terminal;

a notifying module configured to notify a streaming media server receiving streaming media data provided by the mobile terminal;

a server message receiving module configured to receive a response fed back by the streaming media server, wherein the response carries information of a temporary user packet;

a first response module configured to feed a response of the connection request providing the streaming media back to the mobile terminal, wherein the response of the connection request providing the streaming media carries the information of the temporary user packet;

another server message receiving module configured to receive a connection success response sent by the streaming media server; and a second response module configured to, after receiving the connection success response sent by the streaming media server, return the connection success response to a master mobile terminal.

Preferably, the network side device may further include:

a call transfer module configured to receive a call request of requesting for providing the streaming media data of another mobile terminal to the mobile terminal providing the streaming media data, notify an identifier of the mobile terminal providing the streaming media data and an identifier of the another mobile terminal to the streaming media server.

A streaming media server is provided in an embodiment of the disclosure, which includes:

a notification receiving module configured to receive, from a network side device, a notification of receiving streaming media data provided by a mobile terminal;

a user packet establishing module configured to establish a temporary user packet for the mobile terminal providing the streaming media data;

a notification response module configured to, after the temporary user packet is established, feed a response carrying information of the temporary user packet back to the network side device;

a master connection request receiving module configured to receive a connection request of requesting for joining the temporary user packet from the mobile terminal; and a streaming media receiving module configured to establish a connection between a master mobile terminal and the temporary user packet, return a connection success response to the network side device, and receive the streaming media data provided by the mobile terminal.

Preferably, the streaming media server may further include:

a slave connection request receiving module configured to receive a notification of the network side device, wherein the notification includes an identifier of the mobile terminal providing the streaming media data and an identifier of another mobile terminal;

a slave connection processing module configured to establish a connection with the mobile terminal according to the identifier of the another mobile terminal, and add the mobile terminal to the temporary user packet according to the identifier of the mobile terminal providing the streaming media data; and a streaming media providing module configured to, after adding the mobile terminal to the temporary user packet, provide streaming media data of the temporary user packet to the mobile terminal.

The disclosure has the following beneficial effect:

the technical solution provided by the embodiments of the disclosure provides a more flexible and convenient solution for the present streaming media service mode, which can promote the Average Revenue Per User (APRU) value and satisfaction of the value added service of operators under the present 3G or next-generation network, and is an effective supplement to the current streaming media service.

DETAILED DESCRIPTION

In order to attract users, expand usage scenarios of streaming media service and solve the problem of great dependence on content providers during the streaming media service, a remote video live broadcast solution based on streaming media is provided in an embodiment of the disclosure. A specific implementation way of the disclosure will be explained below in conjunction with the accompanying drawings.

When a streaming media service is provided, it may be included: after receiving a connection request providing streaming media initiated by a master mobile terminal (or referred to as a master streaming media client), a wireless communication network establishes a connection for the master mobile terminal, and establishes a temporary user packet for the master mobile terminal; and after the connection is established, the master mobile terminal provides a streaming media data flow to the wireless communication network.

In implementation, it may be further included: after receiving a call request of a slave mobile terminal (or referred to as a slave streaming media client) to the master mobile terminal, the wireless communication network adds the slave mobile terminal to the temporary user packet, and transmits the streaming media data flow provided by the master mobile terminal to the slave mobile terminal.

The specific implementation way will be explained below as follows.

Figure 1:
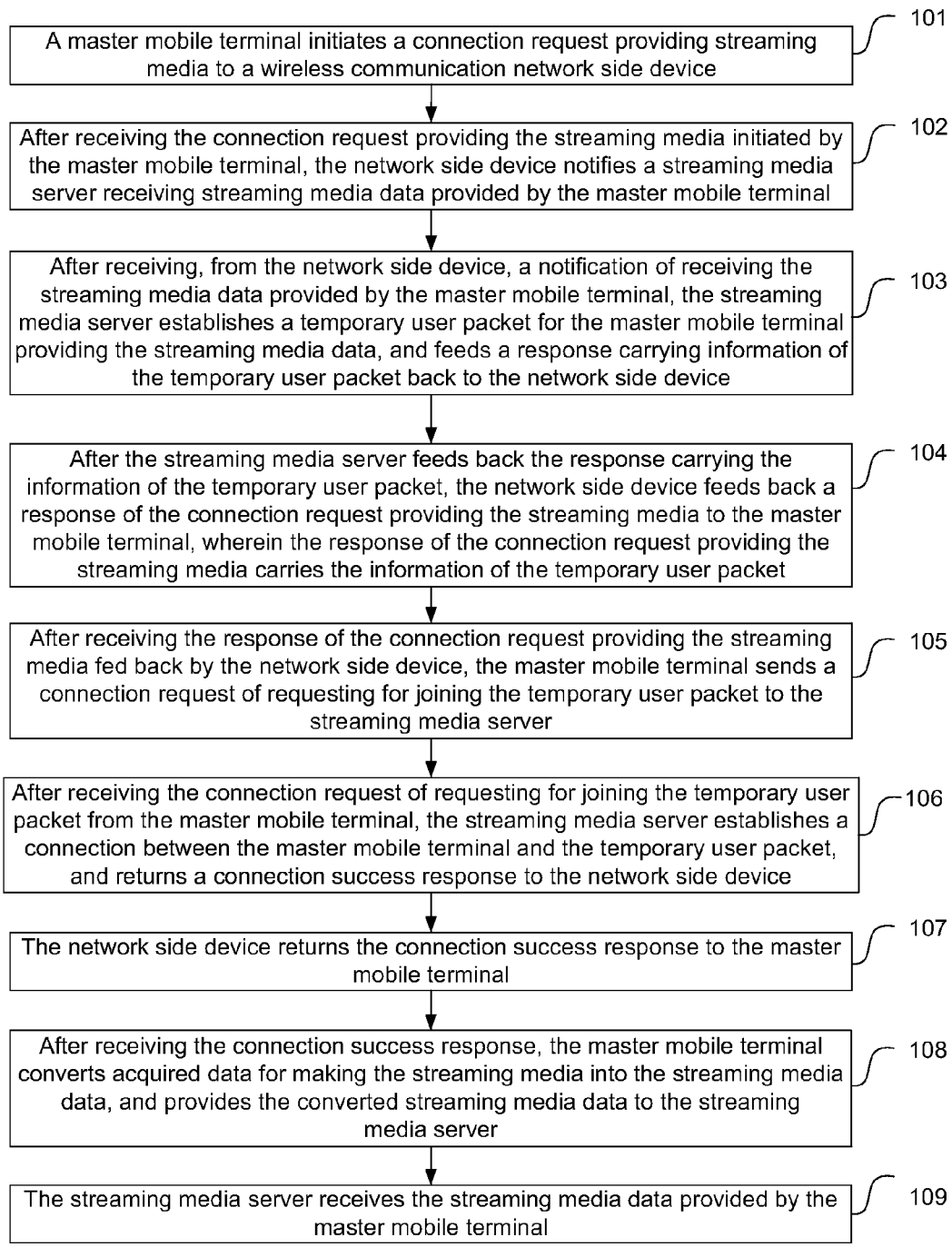
FIG. 1 is a schematic flowchart of implementing a method for providing streaming media service according to an embodiment of the disclosure.

FIG. 1 is a schematic flowchart of implementing a method for providing streaming media service. As shown in the figure, the following steps may be included:

Step 101: a master mobile terminal initiates a connection request providing streaming media to a wireless communication network side device;

Step 102: after receiving the connection request providing the streaming media initiated by the master mobile terminal, the network side device notifies a streaming media server receiving streaming media data provided by the master mobile terminal;

Step 103: after receiving, from the network side device, a notification of receiving the streaming media data provided by the master mobile terminal, the streaming media server establishes a temporary user packet for the master mobile terminal providing the streaming media data, and feeds a response carrying information of the temporary user packet back to the network side device;

Step 104: after the streaming media server feeds back the response carrying the information of the temporary user packet, the network side device feeds back a response of the connection request providing the streaming media to the master mobile terminal, wherein the response of the connection request providing the streaming media carries the information of the temporary user packet;

Step 105: after receiving the response of the connection request providing the streaming media fed back by the network side device, the master mobile terminal sends a connection request of requesting for joining the temporary user packet to the streaming media server;

Step 106: after receiving the connection request of requesting for joining the temporary user packet from the master mobile terminal, the streaming media server establishes a connection between the master mobile terminal and the temporary user packet, and returns a connection success response to the network side device;

Step 107: the network side device returns the connection success response to the master mobile terminal;

Step 108: after receiving the connection success response, the master mobile terminal converts acquired data for making the streaming media into the streaming media data, and provides the converted streaming media data to the streaming media server; and Step 109: the streaming media server receives the streaming media data provided by the master mobile terminal.

In implementation, when another mobile terminal requests for providing the streaming media service, it may be further included:

the slave mobile terminal initiates a call request of requesting for providing the streaming media data to the master mobile terminal providing the streaming media data;

when receiving the call request of requesting for providing streaming media data of the slave mobile terminal to the master mobile terminal providing the streaming media data, the network side device notifies an identifier of the master mobile terminal providing the streaming media data and an identifier of the slave mobile terminal to the streaming media server;

after receiving a notification including the identifier of the master mobile terminal providing the streaming media data and the identifier of the slave mobile terminal from the network side device, the streaming media server establishes a connection with the slave mobile terminal according to the identifier of the slave mobile terminal, and after adding the slave mobile terminal to the temporary user packet according to the identifier of the master mobile terminal providing the streaming media data, the streaming media server provides streaming media data of the temporary user packet to the slave mobile terminal; and after receiving a call success message, the slave mobile terminal receives the streaming media data sent by the streaming media server.

Based on the same inventive concept, a system for providing streaming media service, a master mobile terminal, a slave mobile terminal, a network side device and a streaming media server are further provided in embodiments of the disclosure. Since these devices solve problems according to principles which are similar to the method for providing streaming media service, implementation of these devices may refer to the implementation of the method and repetitions will not be repeated again.

Figure 2:
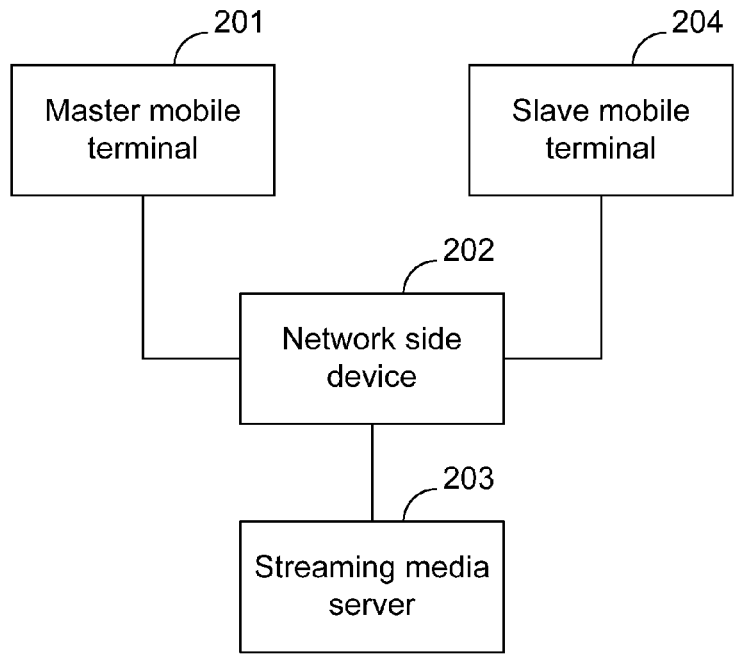
FIG. 2 is a structural diagram of a system for providing streaming media service according to an embodiment of the disclosure.

FIG. 2 is a structural diagram of a system for providing streaming media service. As shown in the figure, the system may include: a master mobile terminal 201, a network side device 202 and a streaming media server 203, wherein the master mobile terminal 201 is configured to initiate a connection request providing streaming media to the wireless communication network side device 202; after receiving a response of the connection request providing the streaming media fed back by the network side device 202, send a connection request of requesting for joining the temporary user packet to the streaming media server 203; and after receiving a connection success response, convert acquired data for making streaming media into streaming media data and provide the converted streaming media data to the streaming media server 203;

the network side device 202 is configured to, after receiving the connection request providing the streaming media initiated by the master mobile terminal 201, notify the streaming media server 203 receiving the streaming media data provided by the master mobile terminal 201; after the streaming media server 203 feeds back a response carrying information of the temporary user packet, feed a response of the connection request providing the streaming media back to the master mobile terminal 201, wherein the response of the connection request providing the streaming media carries the information of the temporary user packet; and after receiving the connection success response sent by the streaming media server 203, return the connection success response to the master mobile terminal 201; and the streaming media server 203 is configured to, after receiving, from the network side device 202, a notification of receiving the streaming media data provided by the master mobile terminal 201, establish the temporary user packet for the master mobile terminal 201 providing the streaming media data, and feed a response carrying the information of the temporary user packet back to the network side device 202; after receiving the connection request of requesting for joining the temporary user packet from the master mobile terminal 201, establish a connection between the master mobile terminal 201 and the temporary user packet, and return a connection success response to the network side device 202; and receive the streaming media data provided by the master mobile terminal 201.

In implementation, the system may further include:

a slave mobile terminal 204 configured to initiate a call request of requesting for providing streaming media data to the master mobile terminal 201 providing the streaming media data; and after receiving a call success message, receive the streaming media data sent by the streaming media server 203;

the network side device 202 may be further configured to, when receiving the call request of requesting for providing the streaming media data of the slave mobile terminal 204 to the master mobile terminal 201 providing the streaming media data, notify an identifier of the master mobile terminal providing the streaming media data and an identifier of the slave mobile terminal 204 to the streaming media server 203; and the streaming media server 203 may be further configured to, after receiving the notification including the identifier of the master mobile terminal 201 providing the streaming media data and the identifier of the slave mobile terminal 204 from the network side device 202, establish a connection with the slave mobile terminal 204 according to the identifier of the slave mobile terminal 204, and after adding the slave mobile terminal 204 to the temporary user packet according to the identifier of the master mobile terminal 201 providing the streaming media data, provide streaming media data of the temporary user packet to the slave mobile terminal 204.

Implementation of each device will be explained below respectively. When each device is implemented separately, problems existing in the master mobile terminal, the slave mobile terminal, the network side device and the streaming media server are also solved, respectively.

Figure 3:
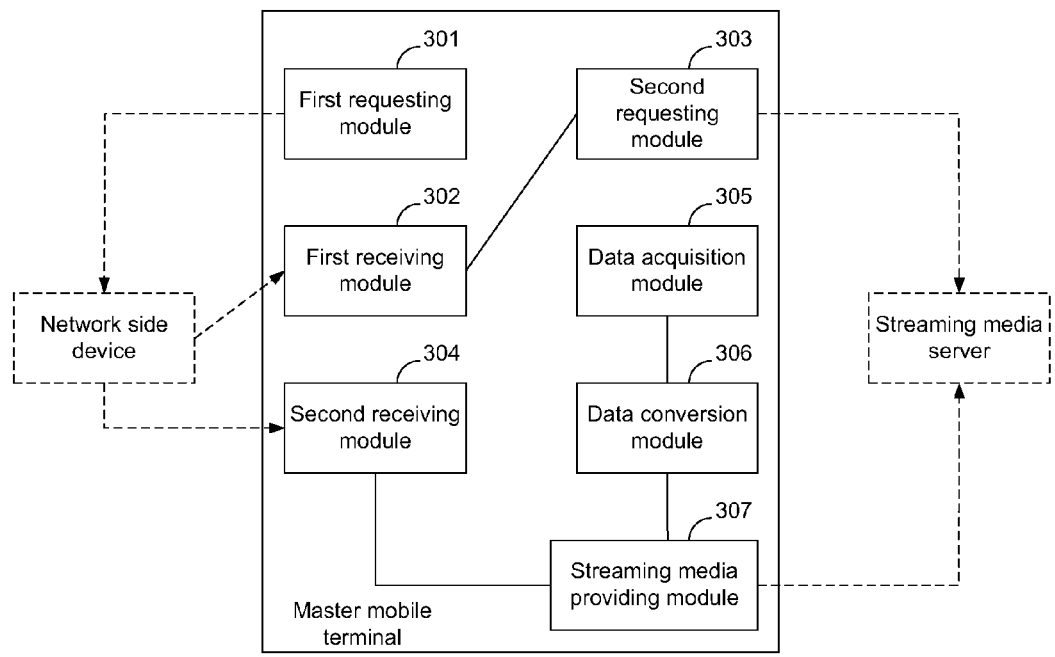
FIG. 3 is a structural diagram of a master mobile terminal according to an embodiment of the disclosure.

FIG. 3 is a structural diagram of a master mobile terminal. As shown in the figure, the master mobile terminal may include:

a first requesting module 301 configured to initiate a connection request providing streaming media to a wireless communication network side device;

a first receiving module 302 configured to receive a response of the connection request providing the streaming media fed back by the network side device;

a second requesting module 303 configured to send a connection request of requesting for joining a temporary user packet to the streaming media server;

a second receiving module 304 configured to receive a connection success response fed back by the network side device;

a data acquisition module 305 configured to acquire data for making the streaming media;

a data conversion module 306 configured to convert the acquired data for making the streaming media into streaming media data; and a streaming media providing module 307 configured to, after receiving the connection success response fed back by the network side device, provide the converted streaming media data to a network side.

Figure 4:
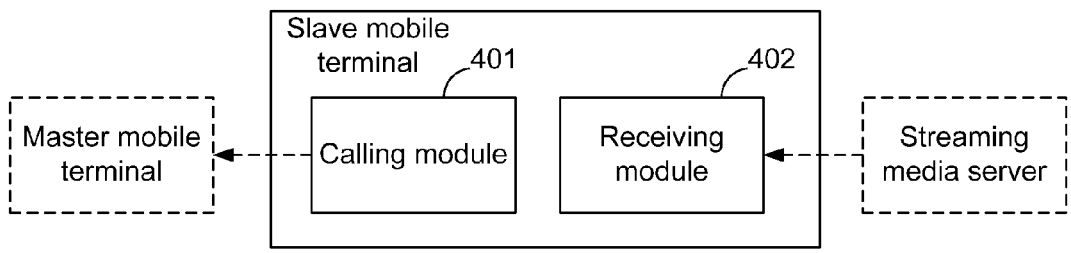
FIG. 4 is a structural diagram of a slave mobile terminal according to an embodiment of the disclosure.

FIG. 4 is a structural diagram of a slave mobile terminal. As shown in the figure, the slave mobile terminal may include:

a calling module 401 configured to initiate a call request of requesting for providing streaming media data to a mobile terminal providing the streaming media data; and a receiving module 402 configured to, after receiving a call success message, receive the streaming media data sent by a streaming media server.

Figure 5:
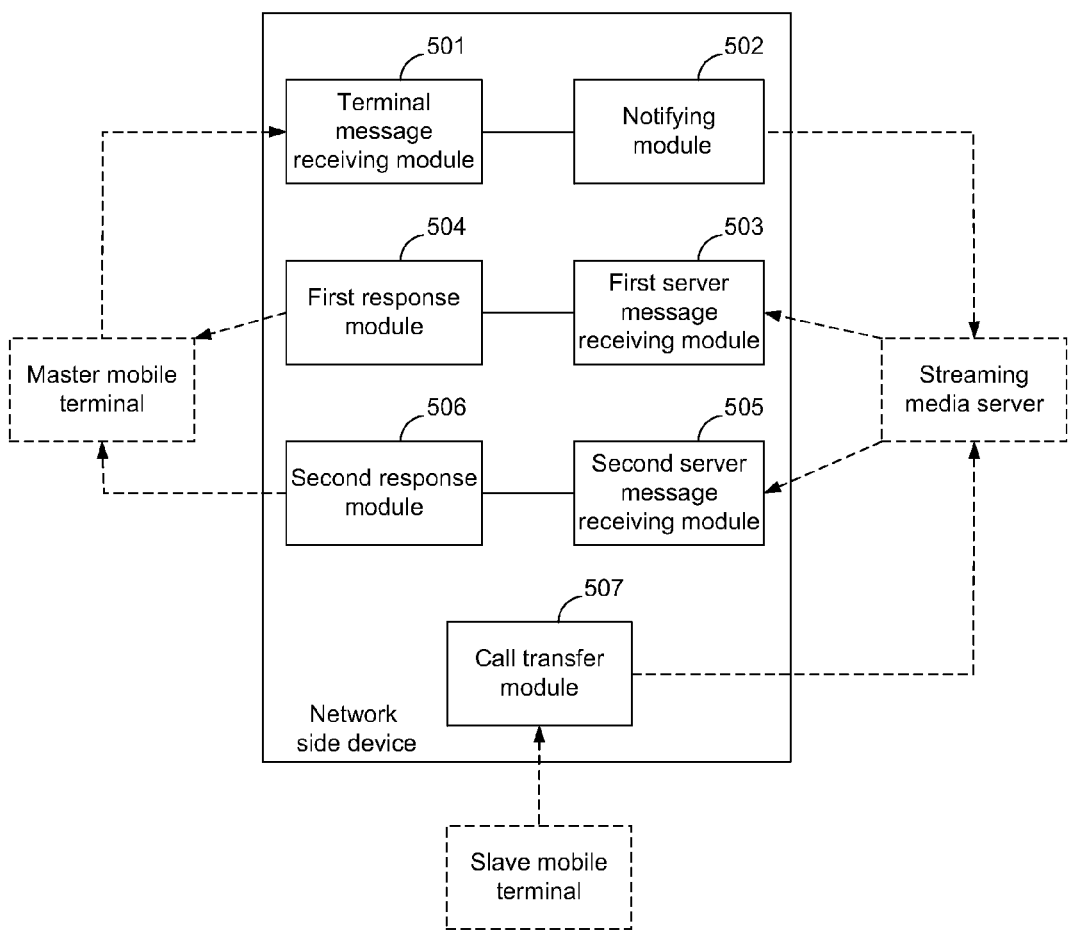
FIG. 5 is a structural diagram of a network side device according to an embodiment of the disclosure.

FIG. 5 is a structural diagram of a network side device. As shown in the figure, the network side device may include:

a terminal message receiving module 501 configured to receive a connection request providing streaming media initiated by a mobile terminal;

a notifying module 502 configured to notify a streaming media server receiving streaming media data provided by the mobile terminal;

a first server message receiving module 503 configured to receive a response fed back by the streaming media server, wherein the response carries information of a temporary user packet;

a first response module 504 configured to feed a response of the connection request providing the streaming media back to the mobile terminal, wherein the response of the connection request providing the streaming media carries the information of the temporary user packet;

a second server message receiving module 505 configured to receive a connection success response sent by the streaming media server; and a second response module 506 configured to, after receiving the connection success response sent by the streaming media server, return the connection success response to a master mobile terminal.

In implementation, the network side device may further include:

a call transfer module 507 configured to receive a call request of requesting for providing the streaming media data of another mobile terminal to the mobile terminal providing the streaming media data, notify an identifier of the mobile terminal providing the streaming media data and an identifier of the mobile terminal to the another streaming media server.

Figure 6:
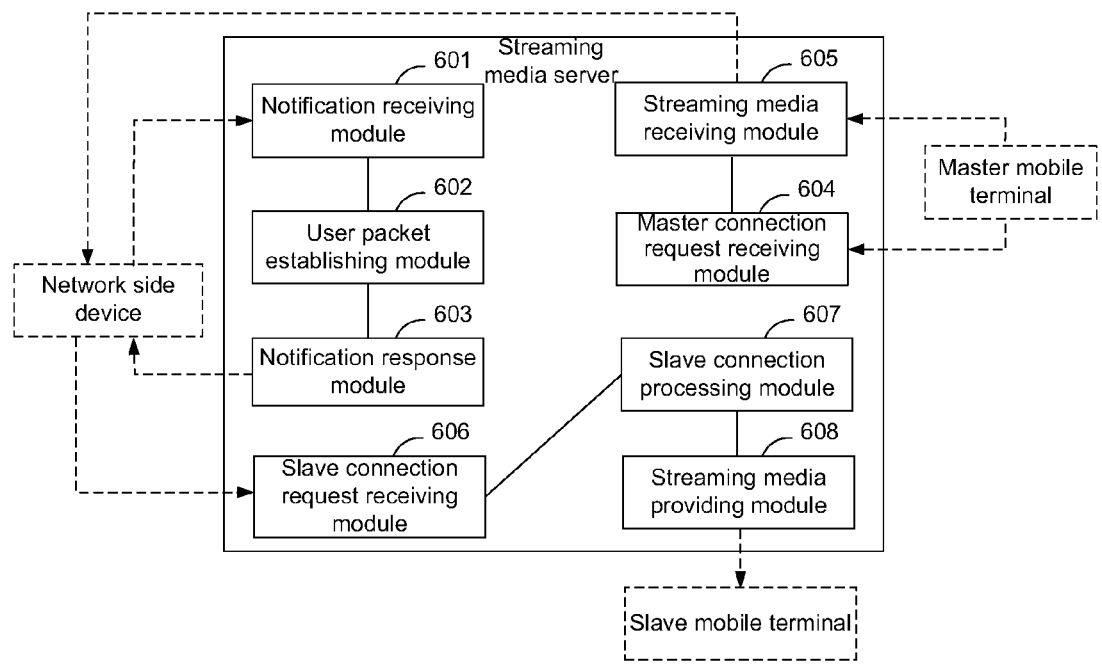
FIG. 6 is a structural diagram of a streaming media server according to an embodiment of the disclosure.

FIG. 6 is a structural diagram of a streaming media server. As shown in the figure, the streaming media server may include:

a notification receiving module 601 configured to receive, from a network side device, a notification of receiving streaming media data provided by a mobile terminal;

a user packet establishing module 602 configured to establish a temporary user packet for the mobile terminal providing the streaming media data;

a notification response module 603 configured to, after the temporary user packet is established, feed a response carrying information of the temporary user packet back to the network side device;

a master connection request receiving module 604 configured to receive a connection request of requesting for joining the temporary user packet from the mobile terminal; and a streaming media receiving module 605 configured to establish a connection between a master mobile terminal and the temporary user packet, return a connection success response to the network side device, and receive the streaming media data provided by the mobile terminal.

In implementation, the streaming media server may further include:

a slave connection request receiving module 606 configured to receive a notification of the network side device, wherein the notification includes an identifier of the mobile terminal providing the streaming media data and an identifier of another mobile terminal;

a slave connection processing module 607 configured to establish a connection with the mobile terminal according to the identifier of the another mobile terminal, and add the mobile terminal to the temporary user packet according to the identifier of the mobile terminal providing the streaming media data; and a streaming media providing module 608 configured to, after adding the mobile terminal to the temporary user packet, provide streaming media data of the temporary user packet to the mobile terminal.

For the convenience of description, each part of the above apparatus is functionally divided into various modules or units to describe respectively. Of course, the function of each module or unit may be realized in the same or multiple software or hardware during the implementation of the disclosure.

The disclosure will be illustrated below by means of an example. However, the following embodiments illustrated below are only used to illustrate and explain the disclosure, instead of constituting a limitation to the technical solution of the disclosure.

Figure 7:
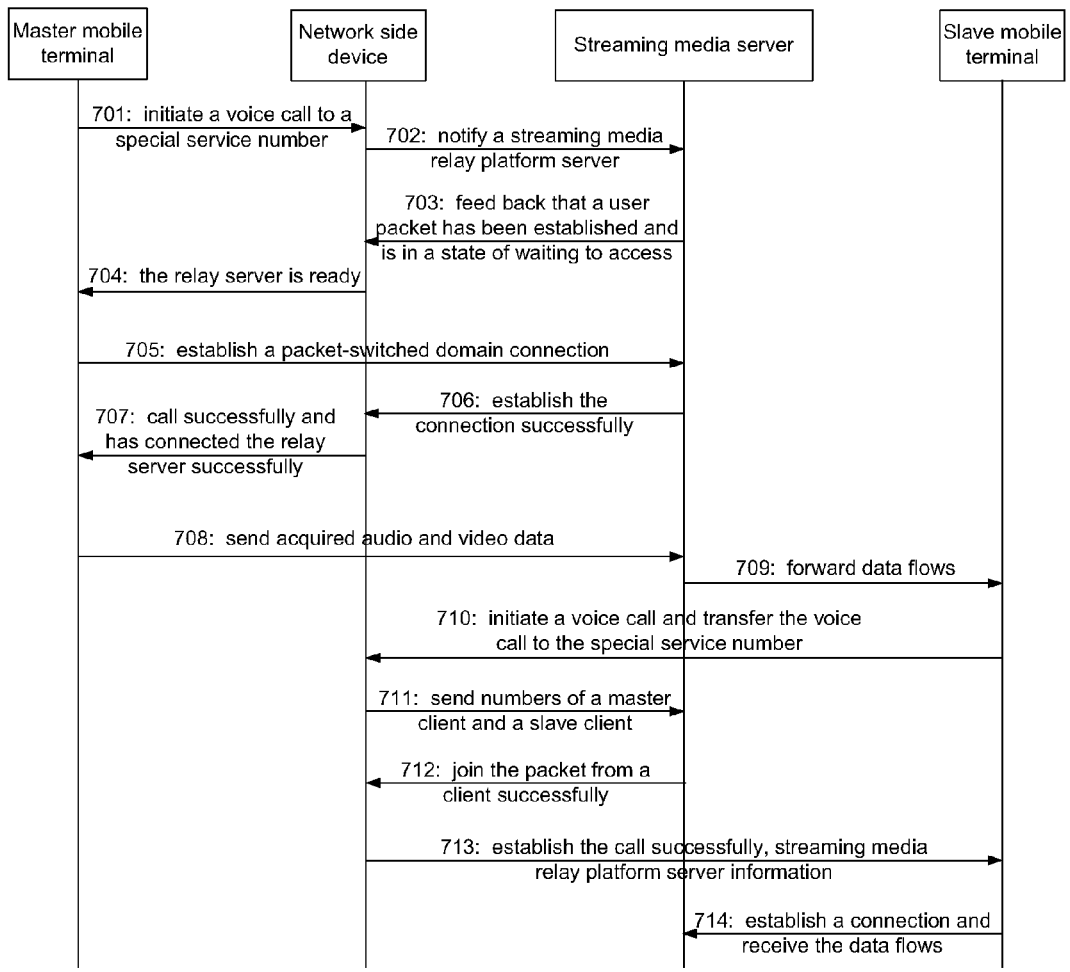
FIG. 7 is a schematic flowchart of implementing remote video live broadcast based on streaming media according to an embodiment of the disclosure.

FIG. 7 is a schematic flowchart of implementing remote video live broadcast based on streaming media. As shown in the figure, it may be included:

Step 701: a master mobile terminal (master streaming media client) initiates a voice call to a special service number;

in specific implementation, the special service number is provided by an operator and configured to identify a service being operated by a user; when the mobile terminal calls the special service number, it means that the mobile terminal is intended to provide streaming media data;

Step 702: after receiving the voice call from the master mobile terminal, a network side device notifies a streaming media server;

in specific implementation, the network side refers to an existing wireless communication network, including a wireless access network, a core network and the like;

Step 703: after receiving a notification, the streaming media server starts to establish a temporary access user packet and feeds back a message to the network side; at the same time, the streaming media server is in a state of waiting for the user to access;

Step 704: the network side device notifies, to the master mobile terminal, a message that the streaming media server is ready;

in specific implementation, the notification message may include information of the temporary user packet of the streaming media server (the packet number being the number of the master mobile terminal) and the address and port information of the server, and the notification message may be transmitted by a wireless signalling procedure and be invisible to the user;

Step 705: after receiving the notification, the master mobile terminal initiates a connection with the streaming media server through a packet-switched domain according to the information in the message;

in specific implementation, the connection simultaneously requests for accessing the temporary user packet provided by the streaming media server;

Step 706: after receiving a connection request sent by the master mobile terminal, the streaming media server establishes a connection with the master mobile terminal and notifies the network side device;

Step 707: the network side device issues a call success message and a connection establishment success message to the master mobile terminal;

Step 708: after receiving the call success message and the connection establishment success notification, the master mobile terminal displays a voice call completion interface which simultaneously displays an option of sending audio and video; and the user chooses to send audio and video, starts a local camera, starts to acquire audio and video data previewed by the camera, codes the audio and video data into streaming media data flows and sends the streaming media data flows to the streaming media server;

in specific implementation, after receiving the connection establishment success notification, the master mobile terminal starts call transfer (all transfer) simultaneously and automatically, wherein the transfer number is the special service number;

if the terminal is provided with a front camera and a back camera, the cameras may be switched during a video acquisition process;

audio and video acquisition is the same as processing of a local camera module; however, since the audio and video acquired by the camera cannot be applied to streaming media playing directly, the acquired audio and video data needs to be coded in accordance with streaming media international standards;

a Transmission Control Protocol/Internet Protocol (TCP/IP) is applied in the sending process of the data flows;

Step 709: after receiving the data flows sent by the master mobile terminal, the streaming media server distributes the data flows to all slave mobile terminals (slave streaming media clients) in the temporary user packet;

the data flows are distributed by using a User Datagram Protocol (UDP), which can improve the utilization ratio of wireless bandwidths and the forwarding efficiency of the data flows.

A processing flow of the master mobile terminal is described above, and processing of the slave mobile terminal will be described below.

Step 710: starting with Step 708, the slave mobile terminal can initiate a call to the master mobile terminal at any time, and the call will be transferred to the special service number automatically according to the call transfer number;

Step 711: the network side notifies the number of the master mobile terminal and the number of the slave mobile terminal to the streaming media server;

Step 712: after receiving a notification, the streaming media server adds the number of the slave mobile terminal to the packet according to the packet number representative of the number of the master mobile terminal, and notifies the network side after adding the number of the slave mobile terminal to the packet successfully;

Step 713: the network side feeds a call success message back to the slave mobile terminal, and simultaneously notifies information of the streaming media server to the slave mobile terminal;

in specific implementation, the information of the streaming media server includes information of the temporary user packet (the packet number being the number of the master mobile terminal) and the address and port information of the server, and the information of the streaming media server is transmitted by a wireless signaling procedure and is invisible to the user;

Step 714: after receiving the message notification, the slave mobile terminal displays a voice call completion interface which displays an option of receiving audio and video; the user chooses to receive audio and video, starts a local streaming media player, establishes a connection with the streaming media server through a packet-switched domain, starts to receive the streaming media data flows forwarded by the streaming media server, and decodes and plays the streaming media data flows locally;

in specific implementation, the master mobile terminal and the slave mobile terminal may be exchanged, which means that any master mobile terminal may may serve as the slave mobile terminal while any slave mobile terminal may also serve as the master mobile terminal;

the involved coding and decoding of the streaming media audio and video accord with standard requirements of the $3^{rd}$ Generation Partnership Project (3GPP) and the Request for Comments (RFC) of the Internet Engineering Task Force (IETF); and the involved call signalling procedures accord with the standards of the 3GPP.

The solution above may be implemented in any wireless terminal provided with a built-in camera, a streaming media module and protocols thereof.

In specific implementation, the master mobile terminal may also serve as the mobile terminal which receives streaming media, while the slave mobile terminal may serve as the mobile terminal which provides the streaming media; the master mobile terminal refers to the terminal which provides streaming media data, while the slave mobile terminal refers to the mobile terminal which receives the streaming media data, that is, when a mobile terminal is providing streaming media data, the mobile terminal is the master mobile terminal, and when another mobile terminal is receiving the streaming media data, the another mobile terminal is the slave mobile terminal.

It can be seen from the embodiments above that the technical solution provided by the embodiments of the disclosure solves the problem of the present unitary streaming media service and can be widely applied to mobile value-added fields including remote video teaching, training, conferences and the like. In addition, since mobile phone terminals are convenient to carry, the present solution can be used in any place with network coverage wherever and whenever in principle. The technical solution provided by the embodiments of the disclosure is an important expansion to streaming media service.

As will be appreciated by those skilled in the art, the embodiments of the disclosure may be provided as methods, systems, or computer program products. Accordingly, the disclosure may take the form of an entirely hardware embodiment, an entirely software embodiment or an embodiment combining software and hardware aspects. Furthermore, the disclosure may take the form of a computer program product which is implemented on one or more computer-usable storage media (including but being not limited to a disk storage, a Compact Disc Read-Only Memory (CD-ROM), an optical storage and the like) having computer-usable program codes embedded therein.

The disclosure has been described with reference to flowcharts and/or block diagrams of methods, apparatuses (systems) and computer program products according to the embodiments of the disclosure. It should be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, a special purpose computer, an embedded processing machine or other programmable data processing apparatus to produce a machine, such that the instructions, which are executed via the processor of the computer or other programmable data processing apparatus, create a device for implementing functions specified in one or more flows in the flowcharts and/or one or more blocks in the block diagrams.

These computer program instructions may also be stored in a computer-readable memory that can direct a computer or other programmable data processing apparatus to function in a particular manner, such that instructions stored in the computer-readable memory produce a manufacture including an instruction device which implements functions specified in one or more flows in the flowcharts and/or one or more blocks in the block diagrams.

These computer program instructions may also be loaded onto a computer or other programmable data processing apparatus so as to perform a series of operating steps on the computer or other programmable apparatus to produce processing implemented by the computer, such that the instructions which are executed on the computer or other programmable apparatus provide steps for implementing functions specified in one or more flows in the flowcharts and/or one or more blocks in the block diagrams.

While the preferred embodiments of the disclosure have been described, additional variations and modifications to these embodiments may be made by those skilled in the art once they learn the basic inventive concepts. Therefore, it is intended that the appended claims shall be construed to include the preferred embodiments and all variations and modifications falling within the scope of the disclosure.

Obviously, those skilled in the art can perform various modifications and variations on the disclosure without departing from the concept and scope of the disclosure. Thus, if these modifications and variations of the disclosure fall within the scope of the claims of the disclosure and equivalent technologies thereof, the disclosure is also intended to include these modifications and variations.

The invention claimed is:

1. A method for providing streaming media service, comprising:
    initiating, by a master mobile terminal, a connection request providing streaming media to a wireless communication network side device;
    after receiving the connection request providing the streaming media initiated by the master mobile terminal, notifying, by the network side device, a streaming media server receiving the streaming media data provided by the master mobile terminal;
    after receiving, from the network side device, a notification of receiving the streaming media data provided by the master mobile terminal, establishing, by the streaming media server, a temporary user packet for the master mobile terminal providing the streaming media data, and feeding, by the streaming media server, a response carrying information of the temporary user packet back to the network side device;
    after the streaming media server feeds back the response carrying the information of the temporary user packet, feeding, by the network side device, a response of the connection request providing the streaming media back to the master mobile terminal, wherein the response of the connection request providing the streaming media carries the information of the temporary user packet;
    after receiving the response of the connection request providing the streaming media fed back by the network side device, sending, by the master mobile terminal, a connection request of requesting for joining the temporary user packet to the streaming media server;
    after receiving the connection request of requesting for joining the temporary user packet from the master mobile terminal, establishing, by the streaming media server, a connection between the master mobile terminal and the temporary user packet, and returning, by the streaming media server, a connection success response to the network side device;
    returning, by the network side device, the connection success response to the master mobile terminal;
    after receiving the connection success response, converting, by the master mobile terminal, acquired data for making the streaming media into the streaming media data, and providing, by the master mobile terminal, the converted streaming media data to the streaming media server; and
    receiving, by the streaming media server, the streaming media data provided by the master mobile terminal.

2. The method according to claim 1, comprising:
    after receiving a call request of a slave mobile terminal to the master mobile terminal, adding, by the wireless communication network, the slave mobile terminal to the temporary user packet, and transmitting, by the wireless communication network, the streaming media data flow provided by the master mobile terminal to the slave mobile terminal.

3. The method according to claim 2, wherein a process in which the slave mobile terminal obtains the streaming media data flow provided by the master mobile terminal specifically comprises:
    initiating, by the slave mobile terminal, the call request of requesting for providing the streaming media data to the master mobile terminal providing the streaming media data;
    when receiving the call request of requesting for providing streaming media data of the slave mobile terminal to the master mobile terminal providing the streaming media data, notifying, by the network side device, an identifier of the master mobile terminal providing the streaming media data and an identifier of the slave mobile terminal to the streaming media server;
    after receiving a notification including the identifier of the master mobile terminal providing the streaming media data and the identifier of the slave mobile terminal from the network side device, establishing, by the streaming media server, a connection with the slave mobile terminal according to the identifier of the slave mobile terminal, and after adding the slave mobile terminal to the temporary user packet according to the identifier of the master mobile terminal providing the streaming media data, providing, by the streaming media server, streaming media data of the temporary user packet to the slave mobile terminal; and
    after receiving a call success message, receiving, by the slave mobile terminal, the streaming media data sent by the streaming media server.

4. A system for providing streaming media service, comprising: a master mobile terminal, a network side device and a streaming media server, wherein
    the master mobile terminal is configured to initiate a connection request providing streaming media to the wireless communication network side device; after receiving a response of the connection request providing the streaming media fed back by the network side device, send a connection request of requesting for joining the temporary user packet to the streaming media server; and after receiving a connection success response, convert acquired data for making streaming media into streaming media data and provide the converted streaming media data to the streaming media server;
    the network side device is configured to, after receiving the connection request providing the streaming media initiated by the master mobile terminal, notify the streaming media server receiving the streaming media data provided by the master mobile terminal; after the streaming media server feeds back a response carrying information of the temporary user packet, feed a response of the connection request providing the streaming media back to the master mobile terminal, wherein the response of the connection request providing the streaming media carries the information of the temporary user packet; and after receiving the connection success response sent by the streaming media server, return the connection success response to the master mobile terminal; and the streaming media server is configured to, after receiving, from the network side device, a notification of receiving the streaming media data provided by the master mobile terminal, establish the temporary user packet for the master mobile terminal providing the streaming media data, and feed a response carrying information of the temporary user packet back to the network side device; after receiving the connection request of requesting for joining the temporary user packet from the master mobile terminal, establish a connection between the master mobile terminal and the temporary user packet, and return a connection success response to the network side device; and receive the streaming media data provided by the master mobile terminal.

5. The system according to claim 4, wherein the system further comprises: a slave mobile terminal configured to initiate a call request of requesting for providing streaming media data to the master mobile terminal providing the streaming media data; and after receiving a call success message, receive the streaming media data sent by the streaming media server;

the network side device is further configured to, when receiving the call request of requesting for providing the streaming media data of the slave mobile terminal to the master mobile terminal providing the streaming media data, notify an identifier of the master mobile terminal providing the streaming media data and an identifier of the slave mobile terminal to the streaming media server; and the streaming media server is further configured to, after receiving a notification including the identifier of the master mobile terminal providing the streaming media data and the identifier of the slave mobile terminal from the network side device, establish a connection with the slave mobile terminal according to the identifier of the slave mobile terminal, and after adding the slave mobile terminal to the temporary user packet according to the identifier of the master mobile terminal providing the streaming media data, provide streaming media data of the temporary user packet to the slave mobile terminal.

6. A mobile terminal, comprising a processor and respective memory storing computer-readable instructions which when executed by the processor for implementing:

acquiring data for making streaming media;

initiating a connection request providing streaming media to a wireless communication network side device;

receiving a response of the connection request providing the streaming media fed back by the network side device;

sending a connection request of requesting for joining a temporary user packet to the streaming media server;

receiving a connection success response fed back by the network side device;

converting the acquired data for making the streaming media into streaming media data; and after receiving the connection success response fed back by the network side device, providing the converted streaming media data to a network side.

7. A network side device, comprising a processor and respective memory storing computer-readable instructions which when executed by the processor for implementing:

receiving a connection request providing streaming media initiated by a mobile terminal;

notifying a streaming media server receiving streaming media data provided by the mobile terminal;

receiving a response fed back by the streaming media server, wherein the response carries information of a temporary user packet;

feeding a response of the connection request providing the streaming media back to the mobile terminal, wherein the response of the connection request providing the streaming media carries the information of the temporary user packet;

receiving a connection success response sent by the streaming media server; and after receiving the connection success response sent by the streaming media server, returning the connection success response to a master mobile terminal.

8. The network side device according to claim 7, the processor is further configured for implementing:

receiving a call request of requesting for providing the streaming media data of another mobile terminal to the mobile terminal providing the streaming media data, notifying an identifier of the mobile terminal providing the streaming media data and an identifier of the another mobile terminal to the streaming media server.

9. A streaming media server, comprising a processor and respective memory storing computer-readable instructions which when executed by the processor for implementing:

receiving, from a network side device, a notification of receiving streaming media data provided by a mobile terminal;

establishing a temporary user packet for the mobile terminal providing the streaming media data;

after the temporary user packet is established, feeding a response carrying information of the temporary user packet back to the network side device;

receiving a connection request of requesting for joining the temporary user packet from the mobile terminal; and establishing a connection between a master mobile terminal and the temporary user packet, returning a connection success response to the network side device, and receiving the streaming media data provided by the mobile terminal.

10. The streaming media server according to claim 9, the processor is further configured for implementing:

receiving a notification of the network side device, wherein the notification comprises an identifier of the master mobile terminal providing the streaming media data and an identifier of another mobile terminal;

establishing a connection with the mobile terminal according to the identifier of the another mobile terminal, and adding the mobile terminal to the temporary user packet according to the identifier of the mobile terminal providing the streaming media data; and after adding the mobile terminal to the temporary user packet, providing streaming media data of the temporary user packet to the mobile terminal.

* * * * *